United States Patent [19]

Horsley

[11] 4,357,307
[45] Nov. 2, 1982

[54] METHOD OF SEPARATING ISOTOPES IN WHICH A COMPOUNDING OF SELECTIVITY IS ACHIEVED BY LIMITING THE TIMING OF THE COLLECTION STEP

[75] Inventor: John A. Horsley, Cranford, N.J.

[73] Assignee: Exxon Research and Engineering Company, Florham Park, N.J.

[21] Appl. No.: 106,373

[22] Filed: Dec. 21, 1979

[51] Int. Cl.³ .............................................. B01D 59/00
[52] U.S. Cl. ................................. 423/3; 204/157.1 R; 204/158 R
[58] Field of Search .................... 204/157.1 R, 158 R; 423/3

[56] References Cited

FOREIGN PATENT DOCUMENTS 2413120 7/1979 France .

OTHER PUBLICATIONS

Ambartsumyan et al., "Selectivity of Dissociation of Polyatomic . . . ", JETP LeH, vol. 23, No. 4 (Feb. 20, 1976), pp. 194–197.

Primary Examiner—Deborah L. Kyle
Attorney, Agent, or Firm—Richard I. Samuel

[57] ABSTRACT

Methods for separating isotopes are disclosed including providing molecules which contain the element whose isotopes are to be separated and which have an isotopically shifted but overlapping infrared absorption spectrum associated with those isotopes which does not change appreciably upon the absorption of photons, irradiating those molecules at an infrared absorption frequency to isotopically selectively dissociate those molecules and provide molecular fragments which appear over a period of time, and collecting only those molecular fragments which dissociate within a predetermined portion of that time interval. In preferred methods, the isotopes of uranium are separated employing molecules having the general formula $UO_2(A_1 A_2) \cdot L$.

12 Claims, No Drawings

METHOD OF SEPARATING ISOTOPES IN WHICH A COMPOUNDING OF SELECTIVITY IS ACHIEVED BY LIMITING THE TIMING OF THE COLLECTION STEP

FIELD OF THE INVENTION

This invention relates to isotope separation processes, and particularly to laser induced isotope separation processes. More particularly, this invention relates to laser induced uranium separation processes.

BACKGROUND OF THE INVENTION

In accordance with pending U.S. patent application Ser. No. 37,877, filed on May 10, 1979, in the name of John A. Horsley, et al, it is taught that isotopic selectivity can be increased in a laser isotope separation process by adjusting the temperature of a vapor which is to be irradiated such that a substantial portion of the molecules require more than one photon to dissociate. More particularly, it is specifically taught that the maximum separation factor which can be achieved with such molecules starting at thermal equilibrium is a function of the number of and the selectivity of the molecules requiring the least number of photons to dissociate from thermal equilibrium. The minimum number of photons which are necessary to produce dissociation thus depends on the energy gap between the highest thermally populated state and the lowest dissociative state. Thus, if the energy gap is equal to or less than one photon, energy selectivity will approach a single photon selectivity $\alpha$, where $\alpha$ is defined as the ratio of the small signal absorption cross-sections of the isotopic species at a given wavelength.

SUMMARY OF THE INVENTION

The rate of dissociation of molecules increases as the internal energy of the molecules increases. In an ensemble of molecules in thermal equilibrium there is a distribution of internal energies. Thus, upon irradiation with an infrared laser, those molecules having the largest amount of thermal energy will dissociate at the fastest rate because their total internal energy (thermal plus energy deposited by the laser) is largest.

Furthermore, the rate at which molecules dissociate during an infrared irradiation process is dependent upon the rate at which photons are absorbed by those molecules. Thus, if molecules which required only one photon to dissociate all absorbed that single photon and no others before dissociation, the dissociation of those molecules would occur at a certain rate. If, on the other hand, radiation were provided such that the very same molecules requiring only one photon to dissociate in fact absorbed some multiple number of photons prior to dissociation, those molecules would dissociate at a much faster rate. If these molecules contain isotopes of an element and have an overlapping infrared absorption spectrum associated with the isotopes of that element which does not change appreciably upon the absorption of photons, then the isotopic selectivity achieved for these molecules in their laser-induced dissociation will be compounded, i.e. will be $\alpha^n$, where $\alpha$ is defined as the ratio of the small signal absorption cross-section at a given wavelength, and n is the number of photons absorbed before dissociation.

Those molecules in the thermal distribution requiring more than one photon for dissociation would also dissociate, but at a slower rate. However, at a time when those molecules dissociate, the overall isotopic selectivity is reduced because nearly all those molecules of both isotopic species with a higher thermal energy would have already dissociated.

In accordance with this invention it has thus been realized that if one were to irradiate a given ensemble of molecules such that they would dissociate over a time interval, that by collecting those molecules which dissociate in the initial portion of the time interval one is, in effect, segregating those molecules which have the highest thermal energies. Since selectivity is compounded for these molecules if they have absorbed more than one photon, such a compounding of selectivity can be achieved by making the collection in the initial portion of the time interval. Compounding can thus be achieved in accordance with the instant invention, even with an ensemble of molecules which are at a temperature such that a substantial portion of those molecules require only one photon to dissociate. By employing the instant invention, while these molecules would thus require only one photon to dissociate, they in fact absorb more than one photon prior to dissociation.

Of course, it should be recognized that employing the teachings of the aforementioned U.S. patent application Ser. No. 37,877, further improvements in selectivity can be obtained.

Therefore, the method in accordance with this invention includes providing molecules of a compound of elements whose isotopes are to be separated, the molecules having an isotopically shifted but overlapping infrared absorption spectrum associated with those isotopes which does not change appreciably upon absorption of photons, irradiating those molecules at an infrared absorption frequency so as to isotopically selectively dissociate the molecules to provide molecular fragments which appear over a time interval, and collecting only those molecular fragments which dissociate within a predetermined portion of that time interval.

In a preferred embodiment of the present invention, the collecting step is carried out by again irradiating the molecular fragments produced in the initial irradiation step at a second infrared absorption frequency, which most preferably is shifted from the first infrared absorption frequency by less than about 100 cm$^{-1}$.

In the preferred embodiment of this invention the predetermined portion of the time interval during which the molecular fragments appear subsequent to irradiation of the molecules in question, is between about 0.1 and 10 microseconds after initiation of such irradiation. In this embodiment where the collection step comprises a second irradiation, this irradiation can be carried out with sufficient laser power to cause an irreversible reaction to occur. Such an irradiation step can also, however, occur in a subsequent, final irradiation step.

In a preferred embodiment of the present method, the molecules employed will be UO$_2$-containing molecules, and preferably molecules having the formula UO$_2$A$_1$A$_2$·L, including a mixture of $^{235}$UO$_2$ and $^{238}$UO$_2$-containing molecules. In the case of those molecules having the formula UO$_2$A$_1$A$_2$·L, A$_1$ and A$_2$ are monovalent anions and L is a neutral ligand. Preferably these monovalent anions are anions having conjugate acids with boiling points of less than about 200° C. and pK$_a$ values of 4.8 or less.

DETAILED DESCRIPTION

Pending U.S. patent application Ser. No. 865,963, filed on Dec. 30, 1977 in the names of Martin B. Dines et al, discloses a process for the separation of isotopes by irradiating $UO_2$-containing compounds with infrared radiation which is preferentially absorbed by a molecular vibration of molecules of the compound containing a predetermined isotope of the element which is to be separated so as to provide excited molecules of that compound which are enriched in the molecules containing the predetermined isotope, thus enabling separation of those excited molecules. The disclosure of that process in that application is incorporated herein by reference thereto.

The initial irradiation step of the present invention for isotopically selective dissociation of the molecules hereof in order to provide molecular fragments which appear over a given time interval and which bear the elements whose isotopes are to be separated is primarily carried out in accordance with the principles of that invention, i.e. that of Ser. No. 865,963.

These very same principles will also apply to subsequent irradiation steps which might be carried out in accordance with the present invention, i.e. such as where collecting those molecular fragments which dissociate within that time interval is carried out by means of such a second irradiation step and/or where such a second or subsequent irradiation step is carried out with sufficient laser power so as to cause an irreversible reaction to occur.

Once again, as set forth above, the principal object of the present invention is in many respects similar to that of pending Application Ser. No. 37,877 filed, on May 10, 1979 in the names of John A. Horsley et al, that is, causing photodissociation of an ensemble of molecules which absorb more than one photon so as to compound the selectivity of such an isotope separation process. In accordance with the present invention, however, this can be accomplished, for example, even at temperatures at which a substantial portion of these molecules only require one photon in order to dissociate. This can be compared to the invention in the Horsley et al application in which an energy gap is required, namely so as to maintain only a small number of the overall ensemble of molecules at such an energy level. This is accomplished in accordance with this invention by collecting dissociated molecules formed only within a predetermined portion of the time interval constituting the time of dissociation, namely those produced at the initial stages thereof. Such collection, such as by the second irradiation step of this invention as discussed above, must thus be carried out at a time from between about 0.1 and 10 microseconds after initiation of the initial irradiation step, preferably between about 0.1 and 5 microseconds thereafter, and most preferably between about 0.1 and 2 microseconds thereafter. It is thus noted that where the collection step thus comprises a second irradiation, which as set forth above is preferably carried out at a frequency shifted from the first infrared absorption frequency from about 100 cm$^{-1}$, the pulsewidth of such second irradiation is critical. The second pulsewidth should thus be controlled to be less than about 2 microseconds, but at least less than about 5 microseconds. Otherwise it will be impossible to carry out such collection within the predetermined portion of the time interval as required by this invention.

The pulsewidth of the initial irradiation step of this invention is, however, not critical. Thus, as long as the collection step discussed above is conducted in accordance with the requirements set forth herein, it is irrelevant that most if not all of the molecules originally present are eventually dissociated by the initial laser irradiation step. It is preferred, however, to terminate the initial irradiation step immediately prior to the second irradiation or collection step. This would be true merely from an economic standpoint since additional dissociation subsequent to the collection step would not produce any molecular fragments which are to be collected, and would constitute wasted energy.

It is also preferred in accordance with this invention to apply the principles of the aforementioned Horsley et al application since the number of photons absorbed by any given molecule will increase the compounding effect discussed above. While this is the precise point involved in connection with collecting those molecular fragments which dissociate within a predetermined initial portion of the time interval for dissociation, since those molecules which have absorbed larger numbers of photons will be collected thereby, this can be further effected by increasing the energy gap between the highest thermally populated and the lowest dissociative level as discussed in Horsley et al. This is accomplished in accordance with that application by maintaining those molecules at a temperature which provides sufficient molecules at thermal equilibrium that require more than one photon to promote dissociation so that upon such dissociation the isotopic selectivity is at least 10 percent above the maximum selectivity which can be achieved with an ensemble of molecules each of which can dissociate by absorbing a single photon.

In connection with the separation of the isotopes of uranium, a number of $UO_2$-containing molecules which are useful in such a process are disclosed in U.S. patent application Ser. No. 868,450, filed in the names of Messrs. Martin B. Dines et al on Jan. 10, 1978 and now abandoned, and the disclosure of those compounds therein is incorporated herein by reference thereto. Furthermore, a class of $UO_2$-containing compounds which can be employed in the present process are also disclosed in a continuation in part of Ser. No. 868,450, that is, Ser. No. 961,363, filed on Nov. 16, 1978. The disclosure of those compounds in that application is also incorporated herein by reference thereto. Those compounds are disclosed as having the formula $UO_2AA'L_n$, n being either 0 or 1, and AA' being anions whose conjugate acids have boiling points of less than about 200° C. and $pK_a$ values of 4.8 or lower, and in which L is a neutral ligand having a boiling point of less than about 190° C. and an equilibrium constant for its exchange reaction with tetrahydrofuran ranging from about $10^{-3}$ to $10^3$. Preferred anions disclosed in that application include 1,1,1,5,5,5,-hexafluoro-2,4-pentanedionate (hfacac) ($CF_3COCHCOCF_3$); 1,1,1-trifluoro-2,4-pentanedionate ($CF_3COCHCOCH_3$); 3-trifluoromethyl-1,1,1,5,5,5-hexafluoroacetylacetonate (($CF_3CO)_2CCF_3$); 3-trifluoroacetyl-1,1,1,5,5,5-hexafluoro-2,4-pentanedionate (($CF_3CO)_3C$); 3-trifluoro-1,1,1,5,5,5 hexafluoroacetylacetonate (($CF_3CO)_2CCF_3$); 1,1,1,2,2,3,3,7,7-decafluoro-4,6,-heptanedionate ($CF_3COCHCOC_3F_7$); 1,1,1,2,2,6,6,7,7-decafluoro-3,5-heptanedionate (($C_2F_5COCHCOC_2F_5$), etc.

Preferred neutral ligands L disclosed therein include tetrahydrofuran, isopropanol, ethanol, isobutanol, tertbutanol, ethyl acetate, n-propanol, methanol, acetone, dimethylformamide, pyridine, cyclopentanone, dimethyl sulfoxide, acrylonitrile, acetylnitrile, tetrahydrothiophene, ethyl ether, and 1,4-dioxane.

In addition, as set forth in pending U.S. patent application Ser. No. 14,107 filed on Feb. 22, 1979, the $UO_2$-containing compounds for use in this invention can also have the formula $(UO_2AA')_n$, where n is greater than 1, i.e. such that the dimer compound $(UO_2AA')_2$ is included therein. The disclosure of such compounds in Ser. No. 14,107 is therefore also incorporated herein by reference thereto.

Furthermore, as also set forth in the pending Horsley et al application Ser. No. 37,877, filed on May 10, 1979, the neutral ligand L and the above formula $UO_2AA' \cdot L$ will preferably be a base stronger than THF, toward the uranyl ion, or that is L should have an equilibrium constant for its exchange reaction with the complexed tetrahydrofuran of greater than 1. These compounds disclosed in Ser. No. 37,877 are therefore also incorporated herein by reference thereto, and include such compounds where L is trimethylphosphate (TMP), triethylphospheneoxide, hexamethylphosphoramide, dimethyl sulfoxide, and pyridine.

DESCRIPTION OF THE PREFERRED EMBODIMENT

In a preferred embodiment of the present invention, $UO_2(1,1,1-5,5,5$-hexafluoro-2,4-pentanedionate-hexafluoro-2,4-pentanedionate $(hfacac)_2 \cdot$trimethylphosphate (TMP) is provided in the vapor phase under static conditions in a suitable cell. The static conditions employed include having the $UO_2(hfacac)_2 \cdot TMP$ present at a partial pressure in the range of from about 0.01 to about 1.0 torr and at a temperature in the range of from about 80° to about 140° C. Of course, the particular pressures and temperatures selected will be dependent upon each other, since higher pressures will be produced by the higher temperatures, and the particular conditions employed will be such as to provide this material in the vapor phase, while at the same time attempting to minimize the total thermal energy of each molecule.

The output beams from two separately grating tunable pulsed $CO_2$ lasers are combined such that spatial overlap is maximized, e.g., by use of the polarization dependent optical properties of a polished single crystal germanium flat intersecting the beams at a small angle, or by counterpropagating the beams along the same path. These beams are directed at the sample cell and enter the $UO_2 (hfacac)_2 \cdot TMP$ vapor through an infrared transmitting ZnSe window. Pulses from the two lasers are separated in time by an adjustable delay between the instants at which the lasers are triggered. The pulse from the first laser has a FWHM (full width at half maximum) value of 400 ns and that from the second laser has an FWHM value of 70 ns. Of course as discussed above, the pulsewidth of the second laser is critical and must be controlled so as to carry out the collection step within the required predetermined portion of the time interval for dissociation. Thus, pulsewidths shorter than 5 microseconds are required, with typical pulsewidth being about 100 ns, or between about 50 ns and 500 ns.

The $UO_2(hfacac)_2 \cdot TMP$ vapor, containing both $^{235}U$ and $^{238}U$ isotopes, is irradiated by the first $CO_2$ laser pulse tuned to a frequency in the range $954 \pm 4$ cm$^{-1}$ to produce $UO_2(hfacac)_2$ enriched in one of the isotopes of uranium, and free TMP. The degree of enrichment achieved depends upon the frequency chosen as is discussed in co-pending application Ser. No. 37,877 filed concurrently herewith, which disclosure is incorporated herein by reference thereto.

In the absence of the collection step or second laser irradiation step of this invention, the molecular fragments dissociated by the first irradiation step will, after a given period of time, recombine, or that is, these are reversibly dissociated molecules. In this manner, by terminating the first laser irradiation step at or before initiation of the collection step, it is possible to minimize unnecessary dissociation, and at the same time provide recombined molecules which can be subsequently used in the same or similar processes. A second laser pulse delayed with respect to the first laser pulse, and in this case tuned to a frequency in the range of $967 \pm 4$ cm$^{-1}$ is used to irradiate the isotopically enriched $UO_2(hfacac)_2$ produced in the first photodissociation step. Since the $UO_2(hfacac)_2$ is transient in nature and does not form in sufficient quantity for approximately 1/10th of a microsecond after irradiation by the first laser pulse, the collection step in second laser pulse shall not be initiated until 0.1 microseconds after the initiation of the first laser pulse.

It is finally noted that pulse energy densities greater than about 1.5 J/cm$^2$ for the second pulse causes irreversible photochemistry to occur in which the doubly irradiated uranyl species condense and collect on the inner surface of the irradiation cell.

What is claimed is:

1. A method of separating isotopes of an element including the steps of:
   (1) providing molecules of a compound of said element having an isotopically shifted but overlapping infrared absorption spectrum associated with the isotopes of said element which does not change appreciably upon the absorption of photons;
   (2) irradiating said molecules at an infrared absorption frequency to isotopically selectively dissociate said molecules to provide molecular fragments which appear over a time interval; and
   (3) collecting only those molecular fragments which dissociate within a predetermined portion of said time interval.

2. The method of claim 1 wherein said infrared absorption frequency comprises a first infrared absorption frequency and wherein said collecting step comprises irradiating said molecular fragments at a second infrared absorption frequency.

3. The method of claim 1 wherein said predetermined portion of said time interval comprises from between about 0.1 and 10 microseconds after initiation of said irradiating step (2).

4. The method of claim 2 wherein said irradiating step at said second infrared absorption frequency is carried out at a sufficiently higher power to cause an irreversible reaction to occur.

5. The method of claim 1 wherein said molecules comprise a mixture of $^{235}UO_2$ and $^{238}UO_2$-containing molecules.

6. The method of claim 5 wherein said uranyl ion-containing molecules have the formula $UO_2A_1A_2 \cdot L$, wherein $A_1$ and $A_2$ are monovalent anions and L is a neutral ligand.

7. The method of claim 6 wherein said anions have conjugate acids having a boiling point less than about 200° C. and $pK_a$ values of 4.8 or less.

8. The method of claim 6 or 7 wherein said infrared absorption frequency comprises a first infrared absorption frequency, and wherein said collecting step comprises irradiating said molecular fragments at a second infrared absorption frequency.

9. The method of claim 8 wherein said irradiating step at said second infrared absorption frequency is carried out with sufficient power to cause an irreversible reaction to occur.

10. The method of claim 9 wherein said power comprises an energy fluence of at least about 1.5 J/cm$^2$.

11. The method of claim 1 wherein said infrared radiation is provided by a $CO_2$ laser.

12. The method of claim 10 wherein said predetermined portion of said time interval comprises from 0.1 to 10 microseconds after initiation of said irradiating step (2).

* * * * *